Aug. 4, 1970 W. C. -Y. LEE 3,522,540

ENERGY DENSITY MOBILE FM RECEIVER

Filed May 1, 1967 2 Sheets-Sheet 1

INVENTOR
W. C.-Y. LEE
BY R. B. Ardis
ATTORNEY

United States Patent Office 3,522,540
Patented Aug. 4, 1970

3,522,540
ENERGY DENSITY MOBILE FM RECEIVER

William C.-Y. Lee, Murray Hill, N.J., assignor to Bell Telephone Laboratories, Incorporated, Murray Hill, N.J., a corporation of New York Filed May 1, 1967, Ser. No. 634,998
Int. Cl. H04b 7/08
U.S. Cl. 325—305 6 Claims

ABSTRACT OF THE DISCLOSURE

A mobile frequency modulated radio receiver is disclosed that is responsive to the substantially constant energy density of a complex standing wave pattern. An antenna system is provided which detects separate signals respectively associated with separate components of the electromagnetic field. Each of these signals is squared and the squared signals are then summed, producing a signal proportional to the electromagnetic energy density. The resulting summed signal is square-rooted and applied to a linear frequency discriminator.

BACKGROUND OF THE INVENTION

This invention relates to radio communication apparatus and, more particularly, although in its broader aspects not exclusively, to mobile frequency modulated (FM) radio systems.

Radio reception may be seriously impared by reflections of the transmitted signal. When an electromagnetic wave is reflected at normal incidence from a large wall, the interaction between the incident and reflected waves creates a relatively simple standing wave pattern. An electric dipole antenna moving toward the wall finds nulls in the electric field which are repeated at one-half wavelength intervals. In the practical case of a mobile system, the transmitted wave may reach a mobile receiver via several paths because of reflection from nearby objects. Such multiple reflections normally create a complicated three-dimension standing wave pattern. As a conventional mobile receiver passes rapidly through this complex pattern, the received signal strength may exhibit drastic fluctuations. These drastic fluctuations give rise to rapid fading in the output audio signal. At wavelengths shorter than about one meter, the signal strength variations encountered by a rapidly moving automobile may have appreciable components at audio frequencies.

A copending application filed Sept. 29, 1965 by J. R. Pierce, Ser. No. 491,288, and now Pat. No. 3,475,687, issued Oct. 28, 1969, broadly discloses a concept for dealing with these rapid fading problems. It was recognized, therein, that the energy density of the electromagnetic field in a complicated standing wave pattern remains substantially constant even though the individual components thereof vary drastically. The Pierce application shows how to apply this "energy-density" principle to mobile amplitude modulated (AM) radio receivers but fails to show how to apply it to mobile FM radio receivers.

It is, accordingly, an object of the present invention to improve FM radio reception in the presence of standing wave patterns caused by reflections of the transmitted signal.

More particularly, it is an object of the present invention to improve the reception of a mobile FM receiver passing through such a standing wave pattern.

BRIEF SUMMARY OF THE INVENTION

In a principal aspect, the present invention takes the form of an FM radio reeciver in which means are provided to develop a signal which is substantially directly proportional to the relatively constant energy density of the electromagnetic field. The developed signal is then supplied to a linear frequency discriminator, and the discriminator produces a relatively constant signal which does not exhibit rapid fading.

More specifically, the present invention includes in part, an antenna system which is similar to that disclosed in the Pierce application which simultaneously detects individual field components. Each of the detected individual field components is squared in a squaring device and the squared signals are then summed. The resultant signal is substantially directly proportional to the energy density in the electromagnetic field because the squares of the separate field components have been summed. This summed signal is then square-rooted and applied to a linear frequency discriminator.

The signal applied to the discriminator is the square root of the sum of the squares of the individual field components, and, thus, is a linear representation of the energy density. The described system demonstrates how the "energy-density" concept may be applied to mobile FM radio receivers.

DETAILED DESCRIPTION

Figure 1:
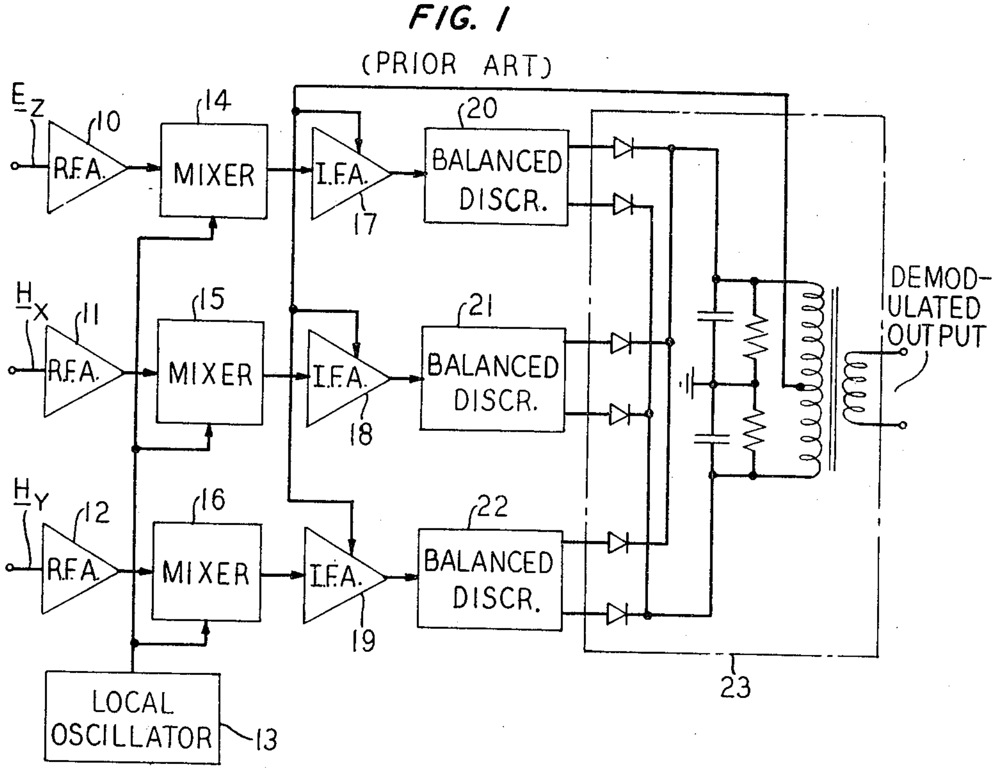
FIG. 1 (PRIOR ART)
FIG. 1 is a block diagram of the prior art, Pierce, FM radio receiver.

The "energy-density" concept necessarily implies the the production of a signal which is proportional to the energy in the electromagnetic field. The prior Pierce application fails to show how to develop such a signal and how to apply the "energy-density" concept to mobile FM reception. The Pierce FM system employs a different apporach which may be more fully understood by referring to FIG. 1, which is a block diagram of the Pierce mobile FM receiver.

Separate components of the electromagnetic field are produced by the antenna arrangement disclosed in the Pierce application. These components are applied to respective radio frequency amplifiers 10, 11 and 12. The amplified signals are then mixed with the local oscillator 13 signal in respective mixers 14, 15 and 16. The resultant signals produced by the respective mixers are applied to respective discriminators 20, 21 and 22 after passing through respective intermediate frequency amplifiers 17, 18 and 19. Each of the discriminators produces a signal which is proportional to the individual field components derived by the antenna system. The signals produced by the balanced discriminators are then combined (in block 23, the operation of which is unimportant in regard to the "energy-density" concept) to provide a demodulated output.

The approach shown in FIG. 1 is a field component diversity FM receiver system in that diverse field components are combined to form the output demodulated signal. As has already been indicated, the Pierce application only shows how to apply the "energy-density" concept to AM reception and makes no suggestion of how it may be employed to improve FM reception. The advantages obtained using this principle primarily involve improved reception due to the minimization of the fading problem. The block diagram of FIG. 2, which illustrates an embodiment of the present invention, shows how applicant has solved the problem of applying this concept to mobile FM reception.

Figure 2:
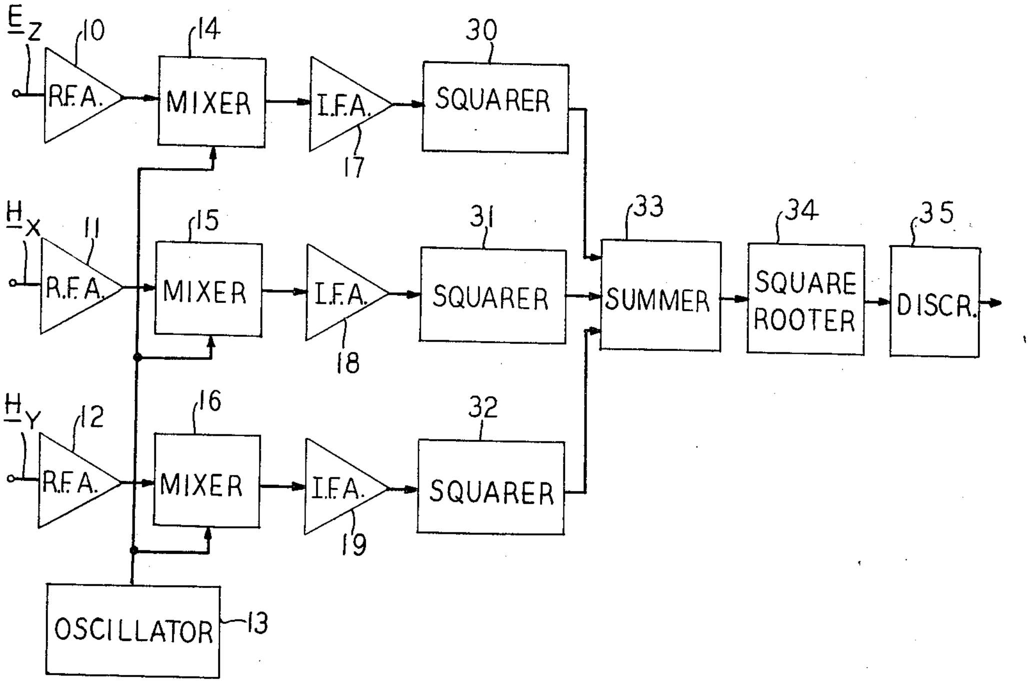
FIG. 2 is a block diagram of an embodiment of the present invention.
Figure 3:
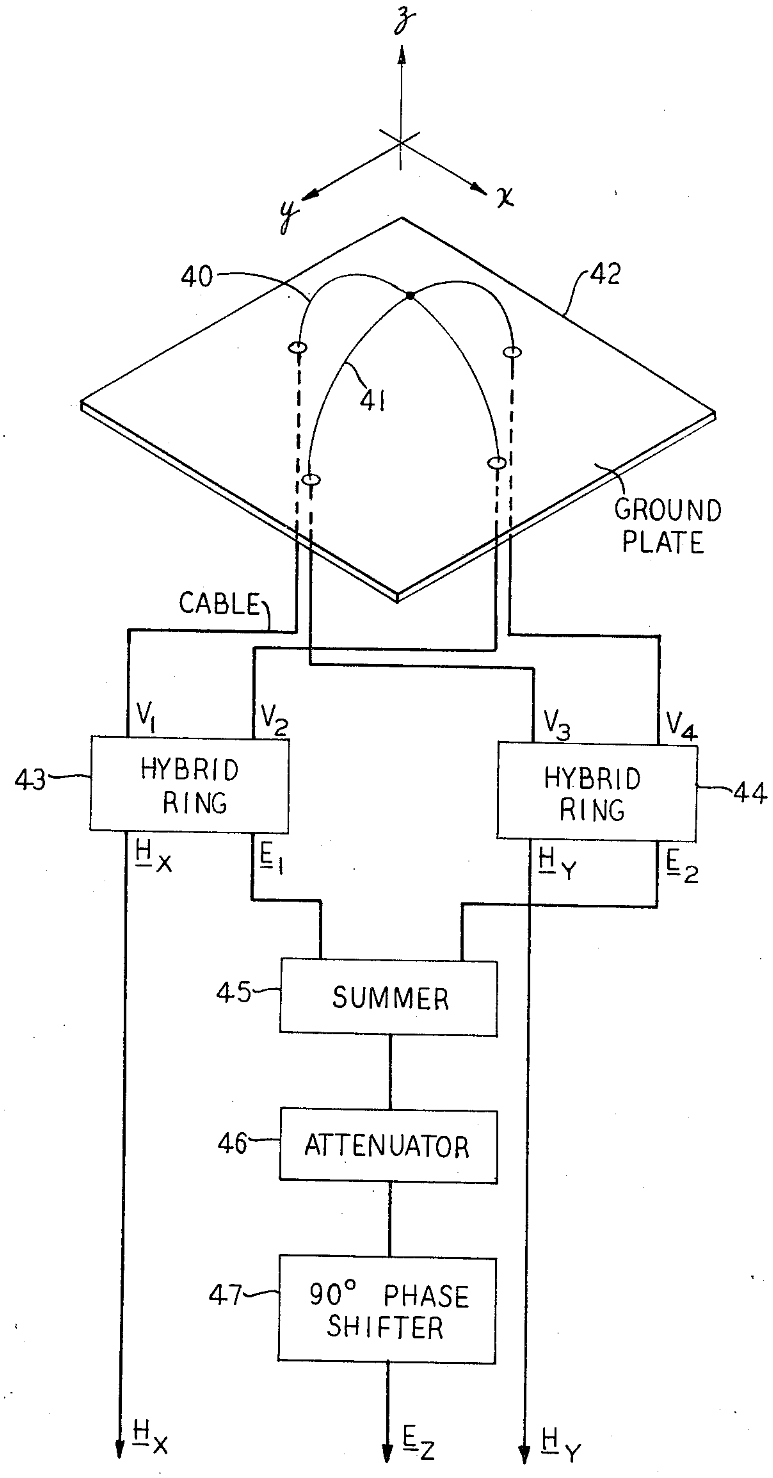
FIG. 3 illustrates an antenna system which may be employed in accordance with the present invention.

Separate components $E_z$, $H_x$ and $H_y$ of the electromagnetic field are derived by the antenna arrangement shown in FIG. 3, and passed through respective amplifiers 10, 11 and 12 (the same numbers are used in FIGS. 1 and 2 to denote similar apparatus) to respective mixers 14, 15 and 16. Local oscillator 13 beats with the amplified signals in mixers 14, 15, and 16. The resultant signals then pass through respective amplifiers 17, 18 and 19. The signals emanating from amplifiers 17, 18 and 19 are representative of the separate components of the electromagnetic radio waves. These separate signals are then passed through respective squaring devices 30, 31 and 32. Squaring devices are well known in the art and an illustrative arrangement is described in an article entitled "Wide-Band Analog Function Multiplier," appearing at p. 160 of the February 1955 Electronics Magazine. The resultant squared signals are then summed in summer 33. The energy density in the electromagnetic field is substantially directly proportional to the squares of the individual field components and, thus, the signal produced by the summing device 33 is representative of this energy density. The square root of the resultant signal from the summing device is then extracted by device 34, which serves to linearize the squared signal. An arrangement for an illustrative square-rooter is disclosed in U.S. Pat. No. 2,702,-857, issued to F. B. Berger et al. Feb. 22, 1955. This linear signal is then passed through the linear FM frequency discriminator 35.

The arrangement described in FIG. 2 improves the fading problem encountered in mobile FM receivers by solving the problem of applying the "energy-density" principle to FM reception. Since the energy density in the standing wave pattern is substantially constant, a mobile receiver utilizing this constant energy density will not encounter the rapid fade problem of other mobile FM radio receivers.

FIG. 3 of the drawings illustrates an antenna system which may be employed to furnish separate field components whose magnitude and phase relationships enable the electro-magnetic energy density to be developed. The antenna system simultaneously detects both the electric and magnetic fields of a propagated plane wave. The antenna consists of two double-ended "semiloops" 40 and 41 with their planes perpendicular to one another and to the plane of the conductive ground plate 42 upon which they are mounted. The loops may be made of equal size and connected at their intersection. Each semiloop has two outputs. The outputs from loop 40 are connected by cable to two inputs of a conventional hybrid ring 43. The $H_x$ output voltage from hydrid 43 is developed by forming the difference between the two input voltages $V_1$ and $V_2$ while the sum of these two voltages is proportional to the $E_z$ field strength and appears at the other output of hybrid 43. Similarly, hybrid ring 44 is connected to two outputs of semiloop 41 and develops voltages proportional to the $H_y$ and $E_z$ fields. The two $E_z$ voltages from hybrids 43 and 44 are substantially identical. The magnitudes of each of $E_z$ voltages ($E_1$ and $E_2$) is less than the magnitude of either the $H_x$ or $H_y$ voltages but the two $E_z$ voltages are combined in a summing device 45. The sum of the two $E_z$ voltages is greater than either of the $H_x$ or $H_y$ voltages. In order to obtain the magnitude and phase relationships necessary to develop a signal representative of the electromagnetic energy density, the summed $E_z$ signals are passed through attenuator 46 and a 90 degrees phase shifter 47. The 90 degrees phase shifter may, for example, be a transmission line of the length $\lambda_C/4$. Other well-known phase shifting devices may be employed. The resultant electric and magnetic fields are then applied to the respective amplifiers 10, 11 and 12 of FIG. 2.

A variety of known antennas may be used in accordance with the invention to sense both the electric and magnetic field components of an incoming wave. In addition, where it is expected that the incoming signals traveling to the receiver location via different paths may also have differing polarizations, three orthogonal loops which are respectively perpendicular to the three axes may be used to detect the total magnetic field regardless of its orientation.

It is to be understood that the embodiment of the invention which has been described is illustrative of the application of the principles of the invention. Numerous modifications can readily be devised by those skilled in the art without departing from the spirit and scope of the invention.

What is claimed is:

1. A mobile frequency modulated radio receiver operating in an electromagnetic field comprising: a linear frequency discriminator, means to develop a signal substantially directly proportional to the energy density in said electromagnetic field, and means to produce the square root of said signal and to supply said square root of said signal to said discriminator.

2. Apparatus as set forth in claim 1 wherein said means to develop said signal includes means to simultaneously detect a plurality of field components in said electromagnetic field, means to produce the squares of said detected components, and means to combine said squares of said detected components.

3. Apparatus as set forth in claim 2 wherein said plurality of field components includes at least one electric and one magnetic field component in said electromagnetic field.

4. Apparatus as set forth in claim 2 where said means to develop said signal further includes means to adjust the magnitude and phase relationships between the detected field components.

5. A mobile frequency modulated radio receiver operating in an electromagnetic field comprising an antenna system arranged to detect a plurality of separate field components, phase shifting and attenuating means to adjust the phase and magnitude relationships respectively between the detected field components, means for separately squaring said adjusted field components, means for summing said squared field components to produce a signal proportional to the energy density in said electromagnetic field, and means for linearizing said summed signal to produce a linear signal by taking the square root of said summed signal and applying said linear signal to a linear frequency discriminator.

6. A mobile frequency modulated radio receiver operating in an electromagnetic field comprising an antenna system arranged to simultaneously detect the electric and magnetic field components of the electromagnetic field, attenuator and phase shifter circuit means for adjusting the magnitude and phase relationship respectively between the detected electric and magnetic field components, a plurality of mixer circuits each associated with a respective one of said detected electric and magntic field components, a local oscillator circuit supplying a beat signal to each of said mixer circuits to beat with the detected field component signal, a plurality of squaring circuits, each one associated with a respective detected electric and magnetic field component and supplied with the resultant signal from a respective mixer circuit, a circuit, for summing the respective squares of the detected electric and magnetic field components, and means for applying said summed squared signals to a square-rooting device and applying the output of said square-rooting device to a linear frequency discriminator.

References Cited

UNITED STATES PATENTS

| | | | |
|---|---|---|---|
| 2,671,275 | 3/1954 | Burns | 250—39 X |
| 2,694,793 | 11/1954 | Martin | 324—8 |
| 3,021,073 | 2/1962 | Mayle | 235—192 |
| 3,030,503 | 4/1962 | Kahn | 325—305 X |

OTHER REFERENCES

Electronics, May 1954, pp. 130–133, "Mobile F-M Broadcast Receiver Design," Onder, Kerim.

ROBERT L. GRIFFIN, Primary Examiner

B. V. SAFOUREK, Assistant Examiner

U.S. Cl. X.R.

235—193; 325—344, 366